(12) United States Patent
Bloom et al.

(10) Patent No.: US 7,452,820 B2
(45) Date of Patent: Nov. 18, 2008

(54) RADIATION-RESISTANT ZONE PLATES AND METHOD OF MANUFACTURING THEREOF

(75) Inventors: Scott H. Bloom, Encinitas, CA (US); James J. Alwan, Ramona, CA (US)

(73) Assignee: Gatan, Inc., Warrendale, PA (US)

( * ) Notice: Subject to any disclaimer, the term of this patent is extended or adjusted under 35 U.S.C. 154(b) by 522 days.

(21) Appl. No.: 11/161,510

(22) Filed: Aug. 5, 2005

(65) Prior Publication Data

US 2007/0066069 A1    Mar. 22, 2007

Related U.S. Application Data

(60) Provisional application No. 60/598,966, filed on Aug. 5, 2004.

(51) Int. Cl.
*H01L 21/311* (2006.01)

(52) U.S. Cl. .................. 438/700; 359/565; 359/569; 257/E21.026; 257/E21.231; 257/E21.238

(58) Field of Classification Search .......... 438/700, 438/717, 736; 359/565, 569
See application file for complete search history.

(56) References Cited

U.S. PATENT DOCUMENTS

| 3,723,246 | A |   | 3/1973  | Lubin          |
|-----------|---|---|---------|----------------|
| 4,205,278 | A |   | 5/1980  | George et al.  |
| 4,317,036 | A |   | 2/1982  | Wang           |
| 4,376,752 | A |   | 3/1983  | Nuckolls et al.|
| 4,432,933 | A |   | 2/1984  | Teitel et al.  |
| 4,608,222 | A |   | 8/1986  | Brueckner      |
| 4,687,618 | A |   | 8/1987  | Nuckolls et al.|
| 4,723,262 | A |   | 2/1988  | Noda et al.    |
| 4,725,511 | A | * | 2/1988  | Reber ................ 428/620 |
| 4,870,674 | A |   | 9/1989  | Schmahl et al. |
| 4,979,203 | A |   | 12/1990 | Suckewer et al.|
| 5,021,628 | A |   | 6/1991  | Lemelson       |
| 5,107,526 | A |   | 4/1992  | Hoover         |
| 5,131,023 | A |   | 7/1992  | Yasugaki et al.|

(Continued)

OTHER PUBLICATIONS

Kaulich, Burkhard, et al.; Differential Interference Contrast X-Ray Microscopy with Twin Zone Plates; 2002 Optical Society of America; vol. 19, No. 4/Apr. 2002/ J. Opt. Soc. Am. A, pp. 797-806.

(Continued)

*Primary Examiner*—Quoc D Hoang
(74) *Attorney, Agent, or Firm*—Caesar, Rivise, Bernstein, Cohen & Pokotilow, Ltd.

(57) ABSTRACT

Disclosed are radiation-resistant zone plates for use in laser-produced plasma (LPP) devices, and methods of manufacturing such zone plates. In one aspect, a method of manufacturing a zone plate provides for forming a masking layer over a supporting membrane, and creating openings through the masking layer in a diffractive grating pattern. Such a method also provides depositing radiation absorbent material in the openings in the masking layer and on the supporting membrane, and then stripping the remaining portions of the masking layer. Then, portions of the supporting membrane not covered by the absorbent material are removed, wherein the remaining portions of the supporting membrane covered by the absorbent material form separate grates. Also in such methods, cross-members are coupled to the grates for holding positions of the grates with respect to each other.

15 Claims, 1 Drawing Sheet

U.S. PATENT DOCUMENTS

| | | |
|---|---|---|
| 5,131,957 A | 7/1992 | Epstein et al. |
| 5,132,994 A | 7/1992 | Kato |
| 5,177,774 A | 1/1993 | Suckewer et al. |
| 5,204,887 A | 4/1993 | Hayashida et al. |
| 5,216,699 A | 6/1993 | Iketaki |
| 5,222,113 A | 6/1993 | Thieme et al. |
| 5,311,565 A | 5/1994 | Horikawa |
| 5,351,279 A | 9/1994 | She et al. |
| 5,434,901 A | 7/1995 | Nagai et al. |
| 5,450,463 A | 9/1995 | Iketaki |
| 5,487,094 A | 1/1996 | Sudo |
| 5,550,887 A | 8/1996 | Schmal et al. |
| 5,590,168 A | 12/1996 | Iketaki |
| 5,680,429 A | 10/1997 | Hirose et al. |
| 5,790,627 A | 8/1998 | Iketaki |
| 5,832,052 A | 11/1998 | Hirose et al. |
| 5,864,599 A | 1/1999 | Cowan, deceased et al. |
| 5,991,360 A | 11/1999 | Matsui et al. |
| 6,157,701 A | 12/2000 | Hirose et al. |
| 6,167,112 A | 12/2000 | Schneider |
| 6,197,608 B1 * | 3/2001 | Ha .............................. 438/22 |
| 6,304,630 B1 | 10/2001 | Bisschops et al. |
| 6,522,717 B1 | 2/2003 | Murakami et al. |

OTHER PUBLICATIONS

Springate, E., et al.; Explosion of Atomic Clusters Irradiated by High-Intensity Laser Pulses; Scaling of Ion Energies With Cluster and Laser Parameters; 2000 The American Physical Society; Physical Review A, vol. 61, 063201.

Haefke, Henry, Nanoplasma Production, Characterization and Application of a Mesoscopic Plasma; http://www.snf.ch/nfp/nfp36/progress/haefke.html.

* cited by examiner

RADIATION-RESISTANT ZONE PLATES AND METHOD OF MANUFACTURING THEREOF

CROSS-REFERENCE TO RELATED APPLICATION

This application claims the benefit of U.S. Provisional Application Ser. No. 60/598,966, filed on Aug. 5, 2004, entitled "Radiation-Resistant Zone Plates", commonly assigned with the present application and incorporated herein by reference in its entirety for all purposes.

TECHNICAL FIELD

This disclosure generally relates to laser-produced plasma (LPP) devices, and more particularly to radiation-resistant zone plates for focusing radiation generated in the LPP device and having grates that are protected from the radiation passing through the zone plate.

BACKGROUND

Laser-produced plasma (LPP) devices are an attractive source of X-rays or short-wavelength radiation due to their relative small size, high brightness and high spatial stability. Two established applications for LPP are microscopy and lithography. Within such LPP devices, one or more zone plates are often employed as an x-ray condenser in the optic area designed to focus the generated radiation. In addition, zone plates may also be used as an x-ray condenser optic in a microscope or similar instrument.

Zone plates, such as Fresnel zone plates, may be high transmission, low aberration, and are reasonably simple to fabricate when compared to available optics in the x-ray portion of the spectrum. A conventional zone plate design is comprised of an absorbing geometry patterned on the top surface of a highly transmissive membrane. Since such a zone plate is optimized by maintaining the highest contrast between the absorbing geometry and the adjacent non-absorbing regions, the supporting membrane is necessarily very thin and likewise fragile.

Unfortunately, under intense or prolonged illumination conditions (i.e., radiation exposure), the zone plate optic can suffer from radiation damage. As the dose increases, mechanical integrity can be compromised leading to increased aberrations and eventual failure of the zone plate. Specifically, the integrity of the highly transmissive membrane supporting the structure typically begins to fail after prolonged radiation bombardment.

Designs and fabrication methods that limit susceptibility to radiation damage can extend the useful working life; however, conventional approaches to date are limited in this regard. For example, conventional design soften use a flat, solid membrane supporting the entire zone plate. The radiation passing through the zone plate bombards portions of the supporting membrane not protected by a radiation absorbing material. Over time, these areas of the membrane can begin to fail because of exposure, which may result in the entire zone plate failing within the LPP device.

SUMMARY

Disclosed are radiation-resistant zone plates for use in laser-produced plasma (LPP) devices, and methods of manufacturing such zone plates. With a zone plate manufactured as disclosed herein, e.g., a Fresnel diffractive grating zone plate, the only remaining portions of a membrane supporting structure are covered and protected by a radiation absorbing material. Instead of a flat, solid membrane supporting the entire zone plate, the disclosed technique eliminates the use of a solid membrane as the support structure for the zone plate, and provides a series of spaced-apart grates where each grate has a supporting structure protected by absorbent material. Thus, the grates of the zone plate are radiation resistant, and are then held in position by structural cross-members.

In one aspect, a method of manufacturing a zone plate provides for forming a masking layer over a supporting membrane, and creating openings through the masking layer in a diffractive grating pattern. Such a method also provides depositing radiation absorbent material in the openings in the masking layer and on the supporting membrane, and then stripping the remaining portions of the masking layer. Then, portions of the supporting membrane not covered by the absorbent material are removed, wherein the remaining portions of the supporting membrane covered by the absorbent material form separate grates. Also in such methods, cross-members are coupled to the grates for holding positions of the grates with respect to each other.

In another aspect, a radiation-resistant Fresnel zone plate manufactured by the process recited above is disclosed. In some embodiments, the zone plate may comprise separate diffractive grates, each comprising radiation absorbent material formed over distinct portions of a supporting membrane. In addition, such a zone plate may comprise cross-members coupled to the diffractive grates and holding positions of the diffractive grates with respect to each other to provide openings through the zone plate between the diffractive grates.

DETAILED DESCRIPTION

Referring collectively to FIGS. 1A to 1G, illustrated is one embodiment of an intermediate structure 100 being formed using a method of manufacturing a zone plate in accordance with the disclosed principles. After undergoing a manufacturing process as disclosed herein, the intermediate structure 100 will become a zone plate, such as a Fresnel zone plate, for focusing x-rays collected in an LPP device on a specified target. While providing the same or similar focusing capability of conventional zone plates in such devices, zone plates constructed as disclosed herein are capable of better withstanding the radiation from the collected x-rays. As a result, overall maintenance time and expense associated with such LPP devices may be reduced.

Figure 1A:
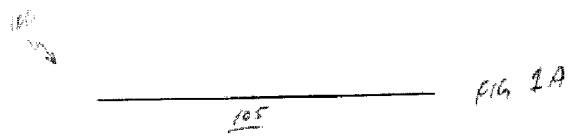
FIGS. 1A-1G illustrate one embodiment of an intermediate structure being formed using a method of manufacturing a zone plate in accordance with the disclosed principles.

The illustrated manufacturing process begins at FIG. 1A, where a supporting structure membrane 105 is fabricated. As with conventionally manufactured zone plates, the membrane 105 is manufactured to be primarily transparent. By being transparent, the membrane 105 allows x-rays or other generated radiation to pass through it where not blocked by opaque material. Materials for forming the supporting structure membrane 105 include, but are not limited to, silicon nitrides (SiNx) and other semiconductor materials. Moreover, the thickness of membrane 105 can depend on the specific application.

Figure 1B:
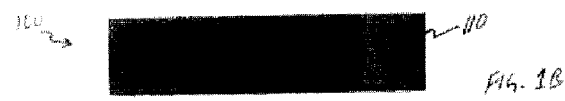
Figure 1C:
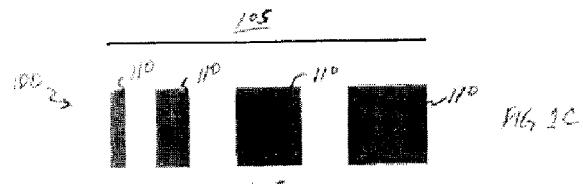

FIG. 1B illustrates the intermediate structure 100 later in the disclosed manufacturing process. Specifically, a masking layer 110 has been formed over the support structure membrane 105. In a preferred embodiment, the masking layer 110 comprises a photoresist layer 110, which may be conventionally available. In addition, the photoresist layer 110 may be deposited over the membrane 105 using conventional deposition techniques used in conventional photolithography processes. In FIG. 1C, the masking layer 110 is patterned in a specific, desired pattern. More specifically, the masking layer 110 is patterned to create openings for manufacturing the diffractive grating properties provided when the zone plate is completed. This may be seen in FIG. 1D, where the openings formed in the photoresist layer 110 are filled in.

Figure 1D:
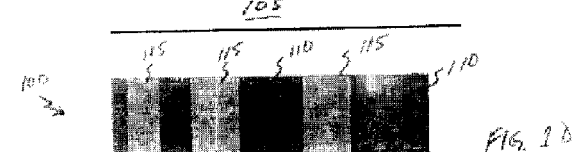

In FIG. 1D, absorbent material 115 is deposited into these openings formed in the intermediate structure 100. As discussed in more detail below, the absorbent material 115 is an opaque material that is capable of blocking the radiation generated in the LPP device holding the finished zone plate. In advantageous embodiments, the absorbent material 115 is a metal, such as nickel, where nickel electroplating may be used to deposit the absorbent material 115 into the openings. Of course, other beneficial materials may be used for the absorbent material 115, and no limitation to any particular material is intended or should be inferred.

Figure 1E:
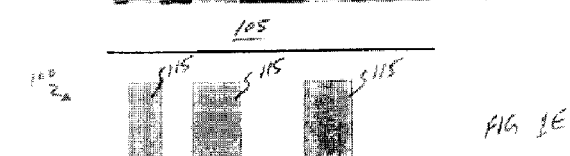

FIG. 1E illustrates the intermediate structure 100 after the masking layer 110 has been removed. In embodiments where the masking layer 110 is a photoresist, a conventional resist strip may be performed on the intermediate structure to remove the layer 110. Once the masking layer 110 is removed, what remains is the absorbent material 115 that filled the prior openings, and now form the grates for the zone plate. The grates may be more easily seen with reference to FIG. 2, as discussed below.

Figure 1F:
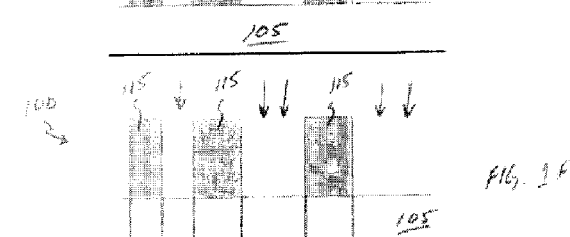

In FIG. 1F, the membrane supporting structure 105 is etched (shown by the illustrated arrows) through the openings found between the different areas of absorbent material 115. The material used to form the supporting structure 105 will dictate what type of etching technique should be used to remove the desired portions of the structure 105. For example, as discussed above, the supporting structure 105 may be comprised of silicon nitride or other similar semiconductor material. In such embodiments, a plasma etch, such as reactive ion etching (RIE), may be employed to etch the supporting structure 105 in the desired locations. In accordance with the disclosed principles, the etching of the supporting structure 105 is accomplished by using the absorbent material 115 forming the grates as an etch mask. Thus, the etching process is also selected so that the absorbent material 115 is not overly damaged when removing the portions of the supporting structure 105.

Figure 1G:
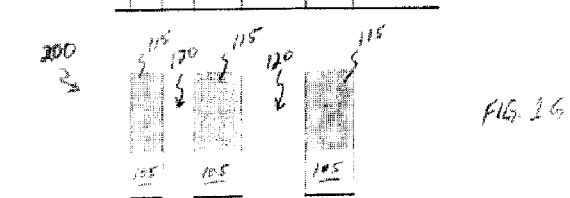

FIG. 1G illustrates a completed zone plate 200 manufactured using the techniques disclosed herein. As shown, once the supporting structure 105 material between the grates (absorbent material 115) is removed, the remaining geometry for the zone plate 200 has the remaining portions of the supporting structure 105 covered by absorbent material 115. Thus, x-rays or other types of radiation passing through the openings 120 in the zone plate 200, as discussed above, cannot impact the remaining portions of the supporting structure 105.

As mentioned above, in conventional zone plates the passing radiation breaks down areas of the membrane supporting structure that the radiation directly contacts (even though this membrane is typically transparent). In contrast, with a zone plate manufactured as disclosed herein, the remaining portions of the membrane supporting structure 105 are covered and protected by the absorbing material 115. Thus, instead of a flat, solid membrane supporting the entire zone plate, the disclosed technique eliminates the use of a solid membrane as the support structure for the zone plate, and provides a series of spaced-apart grates where each grate has a supporting structure 105 protected by absorbent material 115. Thus, the grates of the zone plate 200 are radiation resistant. These distinct grates are then held in position by structural cross-members, which are illustrated in FIG. 2.

Figure 2:
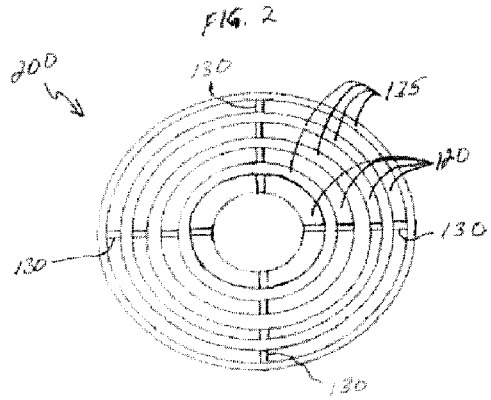
FIG. 2 illustrates a plan view of the zone plate shown in FIG. 1G, which has been manufactured as disclosed herein to include cross-members supporting the grates of the zone plate.

FIG. 2 illustrates a plan view of the zone plate 200 shown in FIG. 1G, which has been manufactured as disclosed herein. In this embodiment, the zone plate 200 includes four distinct grates 125 manufactured as discussed above. Since these grates 125 are distinct and not supported by a single, solid membrane supporting structure (as found in conventional zone plates), cross-members 130 are connected to the grates 125 to hold them in the appropriate positions. In exemplary embodiments, the cross-members 130 are constructed of silicon, depending on the embodiment; however, any appropriate material may be employed to form the cross-members 130. In addition, forming the cross-members 130 may be done using different techniques. For example, in many embodiments, the cross-members 130 formed during the formation of the grates 125, such as depositing the supporting structure 105 and absorbent material 115 over a pre-formed structure that comprises the cross-members 130. In other embodiments, the cross-members 130 may be formed after the grates 125 have been completed. Moreover, although four cross-members 130 are shown in FIG. 2, any fewer or greater number of cross-members 130 may be formed when constructing a zone plate 200 as disclosed herein.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of manufacturing a zone plate, the method comprising:

forming a masking layer over a supporting membrane;

creating openings through the masking layer in a diffractive grating pattern;

depositing radiation absorbent material in the openings in the masking layer and on the supporting membrane;

stripping the remaining portions of the masking layer;

removing portions of the supporting membrane not covered by the absorbent material, wherein the remaining portions of the supporting membrane covered by the absorbent material form separate grates; and providing cross-members coupled to the grates for holding positions of the grates with respect to each other.

2. A method according to claim 1, wherein the masking layer is a photoresist, and creating openings comprises patterning and developing the photoresist.

3. A method according to claim 1, wherein the supporting membrane comprises silicon nitride.

4. A method according to claim 1, wherein depositing radiation absorbent material comprises electroplating nickel in the openings in the masking layer and on the supporting membrane.

5. A method according to claim 1, wherein removing comprises plasma etching portions of the supporting membrane not covered by the absorbent material.

6. A method according to claim 1, wherein providing cross-members comprises coupling cross-members to the remaining portions of the supporting membrane.

7. A method according to claim 6, wherein the coupling further comprises forming cross-members and providing the supporting membrane on the cross-members.

8. A method according to claim 1, wherein the cross-members comprise silicon.

9. A Fresnel zone plate manufactured by the process recited in claim 1.

10. A method of manufacturing a Fresnel zone plate, the method comprising:

providing a semiconductor supporting membrane;

forming a photoresist layer over the supporting membrane;

creating openings through the photoresist layer in a diffractive grating pattern;

depositing radiation absorbent material in the openings in the photoresist layer and on the supporting membrane;

stripping the remaining portions of the photoresist layer;

etching portions of the supporting membrane not covered by the absorbent material, wherein the remaining portions of the supporting membrane covered by the absorbent material form separate grates; and providing cross-members coupled to the grates for holding positions of the grates with respect to each other.

11. A method according to claim 10, wherein depositing radiation absorbent material comprises electroplating nickel in the openings in the photoresist layer and on the supporting membrane.

12. A method according to claim 10, wherein etching comprises plasma etching portions of the supporting membrane not covered by the absorbent material using a reactive ion etching process.

13. A method according to claim 10, wherein providing cross-members comprises coupling cross-members to the remaining portions of the supporting membrane.

14. The zone plate according to claim 13, wherein the coupling further comprises forming cross-members and providing the supporting membrane on the cross-members.

15. A Fresnel zone plate manufactured by the process recited in claim 10.

* * * * *